US011106412B2

(12) United States Patent
Nakajima

(10) Patent No.: US 11,106,412 B2
(45) Date of Patent: Aug. 31, 2021

(54) JOB PROCESSING APPARATUS, METHOD OF CONTROLLING JOB PROCESSING APPARATUS, AND STORAGE MEDIUM

(71) Applicant: CANON KABUSHIKI KAISHA, Tokyo (JP)

(72) Inventor: Satoru Nakajima, Moriya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/520,153

(22) Filed: Jul. 23, 2019

(65) Prior Publication Data

US 2019/0347058 A1 Nov. 14, 2019

Related U.S. Application Data

(63) Continuation of application No. 15/690,118, filed on Aug. 29, 2017, now Pat. No. 10,496,345, which is a continuation of application No. 14/685,285, filed on Apr. 13, 2015, now Pat. No. 9,778,890.

(30) Foreign Application Priority Data

Apr. 16, 2014 (JP) .................. 2014-084719

(51) Int. Cl.
G06F 3/12 (2006.01)

(52) U.S. Cl.
CPC .......... *G06F 3/1267* (2013.01); *G06F 3/1207* (2013.01); *G06F 3/1259* (2013.01); *G06F 3/1285* (2013.01)

(58) Field of Classification Search
CPC .................................................. G06F 3/1267

USPC ......................................................... 358/1.15
See application file for complete search history.

(56) References Cited

U.S. PATENT DOCUMENTS

| 2005/0275885 | A1  | 12/2005 | Sugiyama |
|---|---|---|---|
| 2007/0220353 | A1* | 9/2007  | Iura ...................... G06F 11/0733 714/39 |
| 2009/0033992 | A1* | 2/2009  | Ogiwara ............... G06F 21/608 358/1.15 |
| 2009/0190166 | A1* | 7/2009  | Nakamura ............ G06F 3/1219 358/1.15 |
| 2009/0225352 | A1  | 9/2009  | Nakajima |
| 2012/0148323 | A1* | 6/2012  | Shimada ............... G06F 3/1204 400/76 |

(Continued)

FOREIGN PATENT DOCUMENTS

JP 2007-245703 A 9/2007

*Primary Examiner* — Jacky X Zheng
(74) *Attorney, Agent, or Firm* — Canon U.S.A., Inc. IP Division

(57) ABSTRACT

In a case where a job associated with a user has not been successfully stored in a job processing apparatus, it is not possible to exclusively notify the user that the job has not been successfully stored. A control method in a job processing apparatus includes storing a job such that the job is associated with a user, storing, identification information for identifying the user associated with a job that has not been successfully stored, and notifying the user that the job has not been stored according to login to the job processing apparatus, by the user, in a case where identification information for identifying the user having logged in to the job processing apparatus has been stored.

21 Claims, 17 Drawing Sheets

(56) References Cited

U.S. PATENT DOCUMENTS

2012/0300254 A1 11/2012 Kato
2013/0003105 A1* 1/2013 Yamada .................. G06F 3/122
  358/1.14

* cited by examiner

FIG.3A

PRINTER DRIVER — 300

- 301 — PRINTER NAME: MFP101
- 302:
  - COLOR MODE: FULL COLOR
  - SHEET SIZE: A3
  - NUMBER OF COPIES: 100
  - FINISHING: STAPLE (UPPER LEFT) [CUSTOM...]
- 303 — OUTPUT MODE: PRINT
- 304 — [OK] [CANCEL]

FIG.3B

PASSWORD CONFIRMATION — 310

CONFIRM USER NAME AND PASSWORD.

- USER NAME: UserA — 311
- PASSWORD: aabbcc — 312

[OK] [CANCEL]

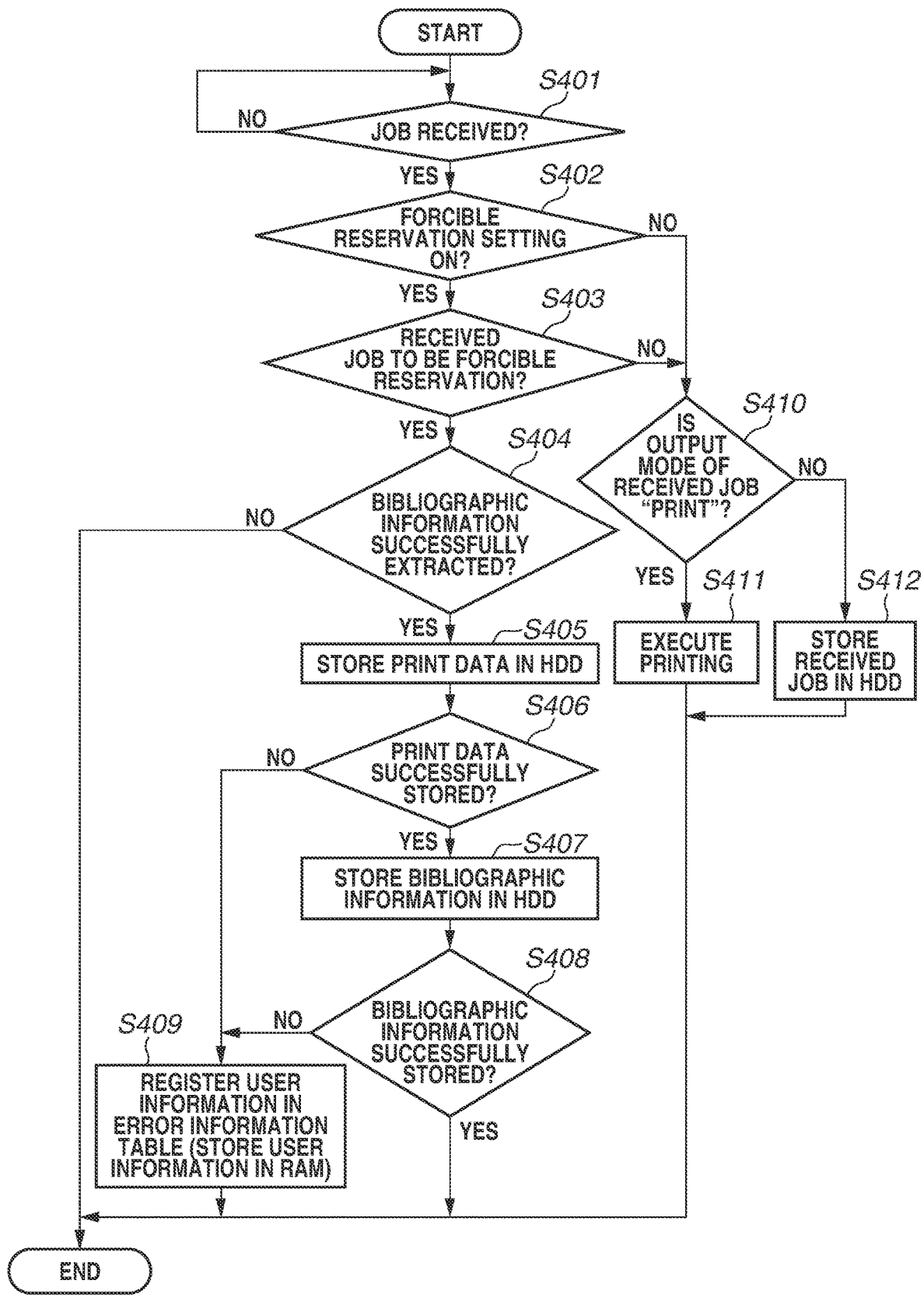

FIG.5A

| USER NAME | STORAGE LOCATION ||| JOB NAME | PRINT SETTING ||||
|---|---|---|---|---|---|---|---|---|
| | DATE/TIME | IP ADDRESS | PATH | | COLOR MODE | SHEET SIZE | NUMBER OF COPIES | FINISHING |
| UserA | 2012.04.10 10:34:45 | 192.168.2.11 | /printdata/0015/xxx | AAA.ppt | FULL COLOR | A3 | 100 | STAPLE (UPPER LEFT) |
| | 2012.04.20 13:50:22 | 192.168.2.11 | /printdata/0691/yyy | BBB.txt | FULL COLOR | A4 | 1 | TWO-SIDED ON |
| | 2012.05.28 14:10:00 | 192.168.2.11 | /printdata/8125/zzz | CCC.doc | GRAYSCALE | A4 2in1 | 10 | PUNCH (LEFT) |
| UserB | 2012.05.28 09:10:05 | 192.168.2.11 | /printdata/0023/sss | DDD.txt | MONOCHROME | B5 | 1 | — |
| UserC | 2012.06.01 21:53:02 | 192.168.2.11 | /printdata/2108/www | EEE.jpg | FULL COLOR | A4 | 1 | — |
| ... | ... | ... | ... | ... | ... | ... | ... | ... |

FIG.5B

| No. | USER NAME |
|---|---|
| 1 | UserA |
| 2 | UserC |
| 3 | ... |
| ... | ... |

FIG.8A

JOB LIST

| ✓ | DATE/TIME | JOB NAME/PRINT SETTING | NUMBER OF PAGES × NUMBER OF COPIES | USER NAME |
|---|---|---|---|---|
| 🔋 | 4/20 13:50 | BBB.txt<br>FULL COLOR A4 TWO-SIDED ON | 5 × 1 | UserA |
|  | 5/28 14:10 | CCC.doc<br>GRAYSCALE A4 2in1 PUNCH (LEFT) | 10 × 10 | UserA |

[PRINT SETTING] [DELETE JOB] [CANCEL PRINTING] [START PRINTING]

FIG.8B

JOB LIST

THERE IS JOB THAT WAS NOT SUCCESSFULLY STORED AT THE TIME OF RECEIPT.

| ✓ | DATE/TIME | JOB NAME/PRINT SETTING | NUMBER OF PAGES × NUMBER OF COPIES | USER NAME |
|---|---|---|---|---|
| 🔋 | 4/20 13:50 | BBB.txt<br>FULL COLOR A4 TWO-SIDED ON | 5 × 1 | UserA |
|  | 5/28 14:10 | CCC.doc<br>GRAYSCALE A4 2in1 PUNCH (LEFT) | 10 × 10 | UserA |

[PRINT SETTING] [DELETE JOB] [CANCEL PRINTING] [START PRINTING]

FIG.11

| DATE/TIME | STORAGE LOCATION | | JOB NAME | PRINT SETTING | | | | USER NAME | STORAGE RESULT |
| | IP ADDRESS | PATH | | COLOR MODE | SHEET SIZE | NUMBER OF COPIES | FINISHING | | |
| 2012.04.10 10:34:45 | 192.168.2.11 | — | AAA.ppt | FULL COLOR | A3 | 100 | STAPLE (UPPER LEFT) | UserA | NG |
| 2012.04.20 13:50:22 | 192.168.2.11 | /printdata/0691/yyy | BBB.txt | FULL COLOR | A4 | 1 | TWO-SIDED ON | UserA | OK |
| 2012.05.28 14:10:00 | 192.168.2.11 | /printdata/8125/zzz | CCC.doc | GRAYSCALE | A4 2in1 | 10 | PUNCH (LEFT) | UserA | OK |
| 2012.05.28 09:10:05 | 192.168.2.11 | — | DDD.txt | MONOCHROME | B5 | 1 | — | UserB | OK |
| 2012.06.01 21:53:02 | 192.168.2.11 | /printdata/0023/sss | EEE.jpg | FULL COLOR | A4 | 1 | — | UserC | NG |
| ... | ... | ... | ... | ... | ... | ... | ... | ... | ... |

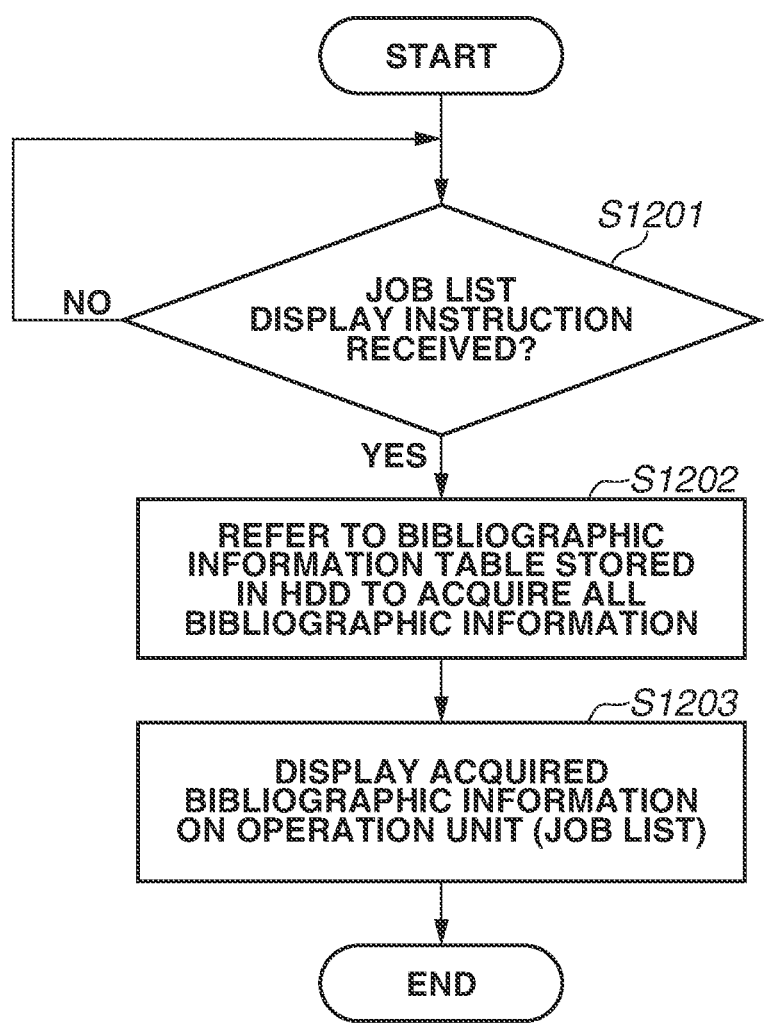

FIG.13

JOB LIST

| STORAGE RESULT | DATE/TIME | JOB NAME/PRINT SETTING | NUMBER OF PAGES × NUMBER OF COPIES | USER NAME |
|---|---|---|---|---|
| NG | 4/10 10:34 | AAA.ppt<br>FULL COLOR A3 STAPLE (UPPER LEFT) | 10 × 100 | UserA |
| OK | 4/20 13:50 | BBB.txt<br>FULL COLOR A4 TWO-SIDED ON | 5 × 1 | UserA |
| OK | 5/28 14:10 | CCC.doc<br>GRAYSCALE A4 2in1 PUNCH (LEFT) | 10 × 10 | UserA |
| OK | 5/28 09:10 | DDD.txt<br>MONOCHROME B5 | 3 × 1 | UserB |
| NG | 6/1 21:53 | EEE.jpg<br>FULL COLOR A4 | 1 × 1 | UserC |

[ PRINT SETTING ▶ ]  [ DELETE JOB ▶ ]  [ CANCEL PRINTING ]  [ START PRINTING ]

FIG.15

| DATE/TIME 1501 | DEPARTMENT ID 1502 | TYPE 1503 | JOB NAME 1504 | USER NAME 1505 | STORAGE RESULT 1506 |
|---|---|---|---|---|---|
| 2012.04.10 10:34:45 | 1111 | SAVE | AAA.ppt | UserA | NG |
| 2012.04.20 13:50:22 | 1111 | PRINT | BBB.txt | UserA | OK |
| 2012.05.28 14:10:00 | 1111 | PRINT | CCC.doc | UserA | OK |
| 2012.05.28 09:10:05 | 2222 | SAVE | DDD.txt | UserB | OK |
| 2012.06.01 21:53:02 | 2222 | SAVE | EEE.jpg | UserC | NG |
| ... | ... | ... | ... | ... | ... |

JOB HISTORY

| DATE/TIME | DEPARTMENT ID | JOB NAME | USER NAME | RESULT |
|---|---|---|---|---|
| 4/10 10:34 | 1111 | AAA.ppt | UserA | NG |
| 5/28 09:10 | 2222 | DDD.txt | UserB | OK |
| 6/1 21:53 | 2222 | EEE.jpg | UserC | NG |

Tabs: PRINT | SAVE

Buttons: PRINT SETTING | DELETE JOB | CANCEL PRINTING | START PRINTING

JOB PROCESSING APPARATUS, METHOD OF CONTROLLING JOB PROCESSING APPARATUS, AND STORAGE MEDIUM

CROSS-REFERENCE TO RELATED APPLICATIONS

This application is a Continuation of U.S. application Ser. No. 15/690,118, filed Aug. 29, 2017; which is a Continuation of U.S. application Ser. No. 14/685,285, filed Apr. 13, 2015, now U.S. Pat. No. 9,778,890, issued Oct. 3, 2017; which claims the benefit of Japanese Patent Application No. 2014-084719 filed, Apr. 16, 2014, each of which are hereby incorporated by reference herein in their entireties.

BACKGROUND

Field

Aspects of the present invention generally relate to a job processing apparatus that stores a job and executes the stored job, a method of controlling the job processing apparatus, and a storage medium.

Description of the Related Art

Conventionally, an image forming apparatus is known which receives a print job input from a host computer and rasterizes print data of the received job to print. In such an image forming apparatus, memory may be exhausted during the rasterization of print data. There is a known technique for notifying an operation panel of the image forming apparatus or the host computer of the exhaustion of the memory (refer to Japanese Patent Application Laid-Open No. 2007-245703).

In a case where a job is not successfully stored, the conventional method can be used for notifying a user that the job has not been successfully stored. However, in a case where a job associated with the user has not been successfully stored, it is not possible to exclusively notify the user that the job has not been successfully stored. Further, by using the conventional method, in a case where a job associated with a user has not been successfully stored, it is not possible to notify the user of information about the job, which has not been successfully stored, associated with the user, and in a case where a job associated with a user has been successfully stored, it is not possible to notify the user of information about the job, which has been successfully stored, associated with the user.

SUMMARY

According to an aspect of the present invention, a job processing apparatus includes a first storing unit configured to store a job such that the job is associated with a user, a second storing unit configured to store identification information for identifying the user associated with a job that has not been successfully stored in the first storing unit, and a notification unit configured to notify the user that the job has not been stored according to login to the job processing apparatus, by the user, in a case where identification information for identifying the user having logged in to the job processing apparatus has been stored in the second storing unit.

Further features of the present disclosure will become apparent from the following description of exemplary embodiments with reference to the attached drawings.

BRIEF DESCRIPTION OF THE DRAWINGS

FIGS. 3A and 3B each illustrate a screen according to a first exemplary embodiment.

FIG. 4 is a flowchart illustrating a control example according to the first exemplary embodiment.

FIGS. 5A and 5B each illustrate an example of a table according to the first exemplary embodiment.

FIGS. 8A and 8B each illustrate a screen according to the first exemplary embodiment.

FIG. 11 illustrates an example of a table according to the second exemplary embodiment.

FIG. 12 is a flowchart illustrating a control example according to the second exemplary embodiment.

FIG. 13 illustrates a screen according to the second exemplary embodiment.

FIG. 15 illustrates an example of a table according to the third exemplary embodiment.

FIG. 17 illustrates a screen according to the third exemplary embodiment.

DESCRIPTION OF THE EMBODIMENTS

Various exemplary embodiments will be described in detail below with reference to the attached drawings. It is to be understood that these exemplary embodiments are not seen to be limiting.

Figure 1:
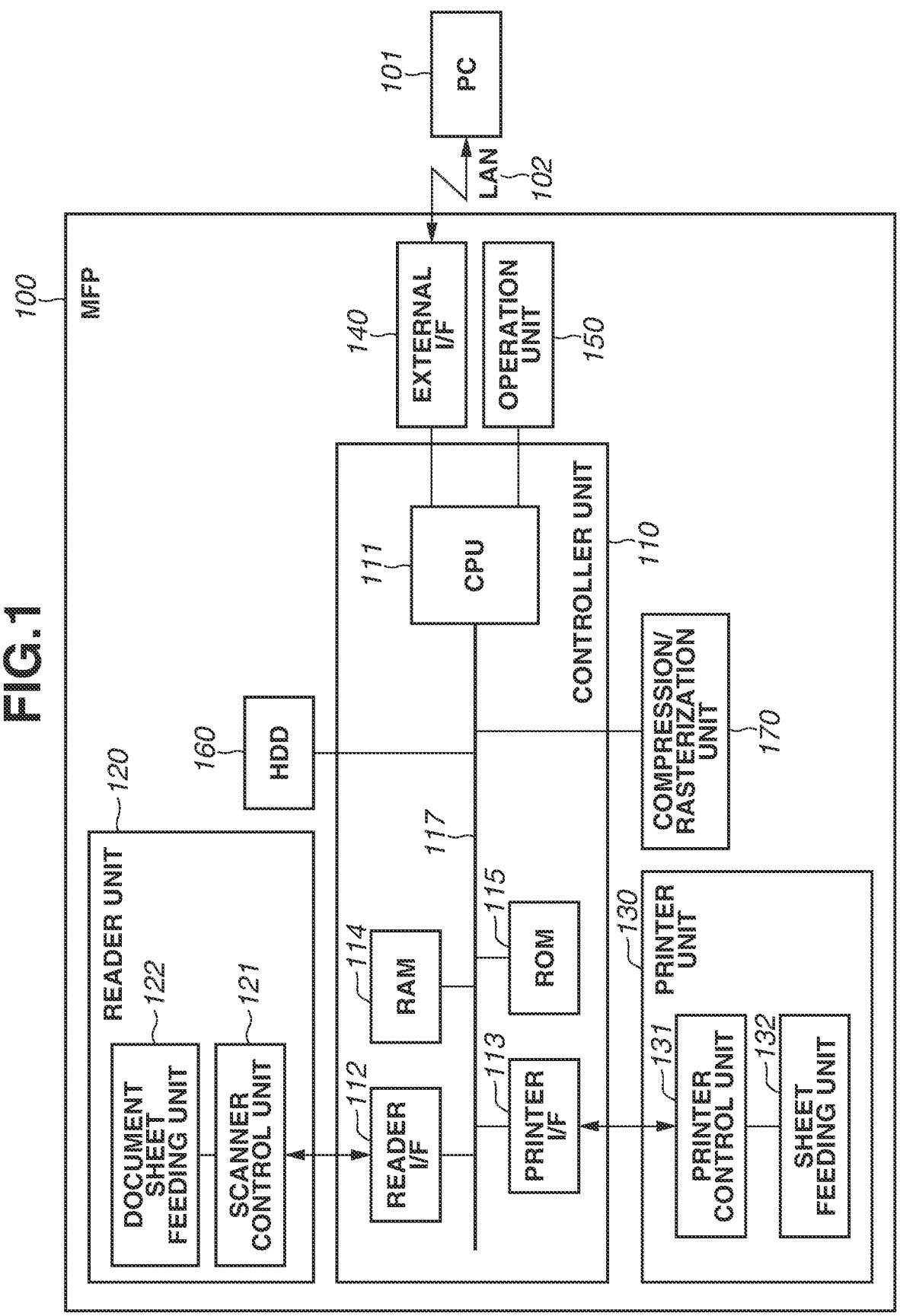
FIG. 1 is a block diagram illustrating a functional configuration of a multifunctional peripheral (MFP) according to a present exemplary embodiment.

The following describes a print system according to a first exemplary embodiment with reference to FIG. 1.

In the first exemplary embodiment, a job associated with a user is received, and the received job is stored. If the received job has not been successfully stored, the user is exclusively notified that there is a job that has not been stored.

Details are described below.

The print system according to the present exemplary embodiment includes a multifunctional peripheral (MFP) 100 and a personal computer (PC) 101. The MFP 100 is an example of a print apparatus (also referred to as a "job processing apparatus"). The PC 101 is an external information processing apparatus.

The MFP 100 has an image reading function to read a document to generate image data. The MFP 100 also has a print function (copy function) to print an image on a sheet based on the generated image data. The MFP 100 also has a print function (PC print function) to receive a print job from an external apparatus such as the PC 101, and to print a text or an image on a sheet based on data for which a print instruction is received. The printing to be carried out by the print function may be color or monochrome printing.

The MFP 100 is connected to the PC 101 via a local area network (LAN) 102 to communicate with the PC 101.

In the present exemplary embodiment, the PC 101 inputs a print job to the MFP 100 via a network such as the LAN 102. Then, the MFP 100 processes the print job input from the PC 101 via the network such as the LAN 102.

While the present exemplary embodiment describes an exemplary case where the MFP 100 and the PC 101 are connected each other via the LAN 102, the MFP 100 and the PC 101 may be connected each other via a wide area network (WAN) such as the Internet. Alternatively, the MFP 100 and the PC 101 may be connected each other via a universal serial bus (USB) cable. Further, the MFP 100 and the PC 101 may be configured to be communicable with each other via wireless communications such as wireless fidelity (Wi-Fi) or Bluetooth®.

The PC 101 generates image data using application software and sends the generated image data to the MFP 100. While the present exemplary embodiment describes the PC 101 as an example of an external information processing apparatus, the information processing apparatus is not limited to the PC 101 and may be a mobile information terminal such as a personal digital assistant (PDA) or a smartphone.

The MFP 100 according to the present exemplary embodiment includes a controller unit (control unit) 110, a reader unit 120, a printer unit 130, an external interface (I/F) 140, an operation unit 150, a hard disk (HDD) 160, and a compression/rasterization unit 170. These components are arranged on a system bus 117 and electrically connected one another to send or receive a control command or data to or from one another. Further, the external I/F 140, which is an example of a communication unit, is an interface for sending and receiving image data to and from the external apparatus. The external apparatus is the PC 101 or, for example, a facsimile, a network connection device, an external dedicated apparatus, etc.

The reader unit 120 includes a scanner control unit 121 and a document sheet feeding unit 122. The scanner control unit 121 controls the communication with the controller unit 110. The document sheet feeding unit 122 feeds a document.

A document reading instruction to the reader unit 120 is given from the controller unit 110 via the scanner control unit 121, and the reader unit 120 optically reads an image of the document and converts it into image data in the form of electric signals. While the present exemplary embodiment will describe a case where a document reading instruction to the reader unit 120 is given from the controller unit 110 via the scanner control unit 121, this is not a limiting case. In a case where the reader unit 120 of the MFP does not include the scanner control unit 121 as its component, a document reading instruction to the reader unit 120 may be given directly from a central processing unit (CPU) 111 of the controller unit 110.

The printer unit 130 includes a printer control unit 131 configured to control the communication with the controller unit 110. The printer unit 130 further includes a sheet feeding unit 132 including a sheet holding unit (sheet feeding cassette, manual sheet feeding tray, etc.) for storing sheets to be used in printing. While the present exemplary embodiment describes multiple sheet feeding cassettes and a manual sheet feeding tray included in the MFP 100 as an example of the sheet holding unit 132, the sheet holding unit 132 may be a sheet feeding deck included in a sheet feeding apparatus to be connected to the MFP 100.

Further, the printer unit 130 executes print processing of a job to be printed that is stored in the HDD 160 of the controller unit 110. An image data print instruction to the printer unit 130 is given from the controller unit 110 via the printer control unit 131, and the printer unit 130 forms (prints) an image based on the image data using toner on a sheet fed from the sheet holding unit and then transfers and fixes the image. While the present exemplary embodiment describes a case where an image data print instruction to the printer unit 130 is given from the controller unit 110 via the printer control unit 131, this is not a limiting case. In a case where the printer unit 130 of the MFP does not include the printer control unit 131 as its component, an image data print instruction to the printer unit 130 may be given directly from the CPU 111 of the controller unit 110.

The controller unit 110 includes therein a non-volatile memory (storage unit) such as the HDD 160 capable of storing multiple jobs to be processed. The HDD 160 can store system software, image data compressed by the compression/rasterization unit 170, which will be described below. Further, the HDD 160 can store print data of a print job to be processed and bibliographic information extracted by analysis of attributes of the print job. The bibliographic information refers to, for example, the time and data of the receipt of the job, the storage location (IP address, path, job name, etc.) of the received job, and print setting information (color mode, sheet size, number of copies, finishing, etc.) about the received job.

The HDD 160 can also store authentication information such as a user name and a password for logging in to the MFP 100. Further, the HDD 160 can store a bibliographic information table 500, which will be described below with reference to FIG. 5A.

While the present exemplary embodiment describes the HDD 160 as an example of a high-capacity and non-volatile storage apparatus, any high-capacity and non-volatile storage apparatus can be used such as a non-volatile memory, e.g., a solid state drive (SSD).

The controller unit 110 has multiple functions. For example, the controller unit 110 can execute a print job by storing in the HDD 160 image data of a document read by the reader unit 120, reading the image data from the HDD 160, and causing the printer unit 130 to print an image on a sheet based on the image data. Further, the controller unit 110 can execute a scanner function by converting image data of a document read by the reader unit 120 into code data and sending the code data to the PC 101, which is an external apparatus, via the external I/F 140, which is an example of a communication unit. Further, the controller unit 110 can execute a print function (PC print function) by storing in the HDD 160 a print job received from the PC 101 via the external I/F 140, converting the code data read from the HDD 160 into image data, and causing the printer unit 130 to print an image on a sheet based on the image data.

The controller unit 110 includes the CPU 111, a read-only memory (ROM) 115, a random-access memory (RAM) 114, a reader I/F 112, and a printer I/F 113.

The CPU 111 controls the processing, operation, and the like of each unit included in the MFP 100.

The ROM 115 is a read-only memory and stores in advance programs such as boot sequences, font information, etc.

The RAM 114 is a readable/rewritable memory and stores image data sent from the reader unit 120 or the external I/F 140, various types of programs, setting information, etc. Further, the RAM 114 can store an error information table 510, which will be described below with reference to FIG. 5B.

The ROM 115 or the HDD 160 stores various types of control programs to be executed by the CPU 111 that are necessary for executing various types of processing specified in flowcharts described below, etc. Then, the CPU 111 reads a program stored in the ROM 115 or the HDD 160, and develops the program in the RAM 114 to execute various types of operations according to the present exemplary embodiment.

The ROM 115 or the HDD 160 stores, for example, a display control program for displaying various types of user interface screens (hereinafter "UI screen") on a display unit of the operation unit 150. UI is the abbreviation for "user interface." Further, the ROM 115 or the HDD 160 stores, as a program for controlling the operation unit 150, a UI function program for recognizing what a user has input from the operation unit 150, and for switching to a suitable screen or providing a processing request instruction to the controller unit 110.

Furthermore, the ROM 115 or the HDD 160 stores, for example, a page description language (PDL) function program for causing the CPU 111 to interpret PDL data received from an external apparatus via the external I/F 140 to rasterize the PDL data into raster image data (bitmap image data), and then causing the controller unit 110 to execute the print function.

The controller unit 110 stores (saves) in the HDD 160 a job to be processed that is input via various input units such as the reader unit 120 or the external I/F 140, and reads the job from the HDD 160 to output the job to the printer unit 130 to be printed. The controller unit 110 also controls the job read from the HDD 160 to send the job to the external apparatus via the external I/F 140.

The compression/rasterization unit 170 includes an image processing block configured to perform processing to compress or decompress image data or the like stored in the RAM 114 or the HDD 160 using various types of compression methods such as the Joint Bi-level Image Experts Group (JBIG) or the Joint Photographic Experts Group (JPEG), and to store the image data again in the RAM 114. Image data compressed by the compression/rasterization unit 170 can be sent to the external apparatus via the external I/F 140.

The controller unit 110 can receive image data from the external apparatus via the external I/F 140. At the time of storing in the HDD 160 image data received via the external I/F 140, the image data is compressed by the compression/rasterization unit 170. On the other hand, at the time of printing an image on a sheet based on the image data stored in the HDD 160, the image data is decompressed by the compression/rasterization unit 170. Further, the controller unit 110 executes various types of output processing to output a job to be processed that is stored in the HDD 160. While the present exemplary embodiment describes the exemplary case where jobs are stored in the HDD 160, the jobs may be stored in a volatile RAM.

The reader I/F 112 is an interface for connecting to the reader unit 120, which is an image input apparatus. The printer I/F 113 is an interface for connecting to the printer unit 130, which is an image output apparatus. The controller unit 110 synchronously/asynchronously converts or controls image data via the reader I/F 112 or the printer I/F 113.

The MFP 100 includes the operation unit 150 including a display unit, which corresponds to an example of a user interface unit. The operation unit 150 of the MFP 100 according to the present exemplary embodiment includes a display unit (not illustrated) and hard keys (not illustrated). The display unit includes a liquid crystal display (LCD) and a touch panel sheet including a transparent electrode (capacitance type may also be used) attached on the LCD. The LCD displays an operation screen and/or the status of the MFP 100. The operation unit 150 has a function to receive various types of user settings via the operation screen or the hard keys. The operation unit 150 also has a function to provide information to the user.

Figure 2:
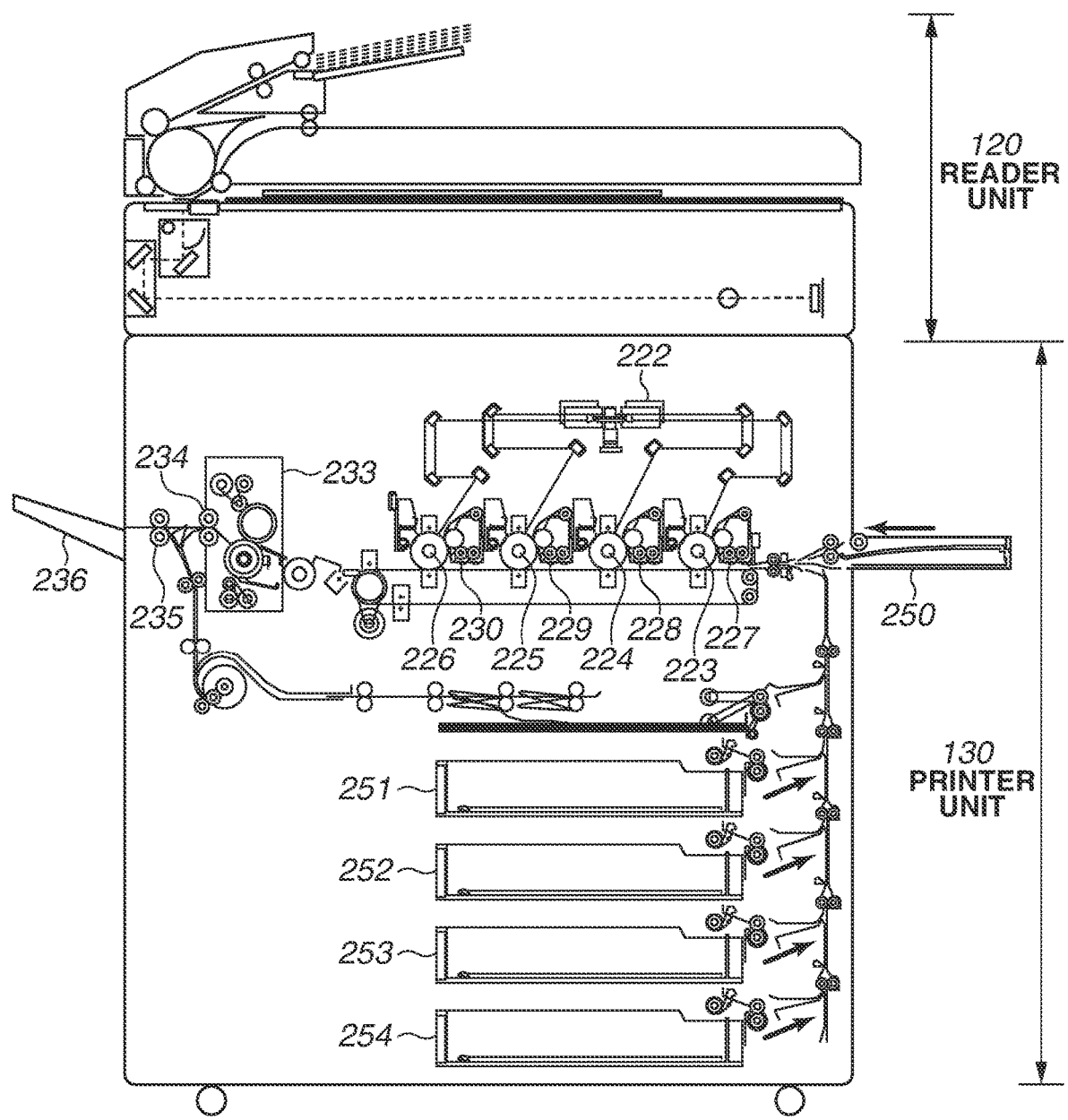
FIG. 2 is a cross sectional view illustrating a configuration of the MFP according to the present exemplary embodiment.

A cross sectional view of the reader unit 120 and the printer unit 130 illustrated in FIG. 1 is as illustrated in FIG. 2.

The following describes an operation to output an image on a sheet based on image data transferred to the printer unit 130.

Image data transferred to the printer unit 130 is converted by a laser unit 222 into a laser beam corresponding to the image data. Then, photosensitive drums 223 to 226 are irradiated with the laser beam to form on the photosensitive drums 223 to 226 latent images corresponding to the laser beam. Toner is applied to the latent image portions of the photosensitive drums 223 to 226 by development units 227 to 230. A color printer includes four photosensitive drums and four development units for cyan, yellow, magenta, and black.

The printer unit 130 includes sheet feeding cassettes 251 to 254 and a manual sheet feeding tray 250 as sheet holding units included in the sheet holding unit 132. Each of the sheet feeding cassettes 251 to 254 is in the shape of a drawer. Each of the sheet feeding cassettes 251 to 254 and the manual sheet feeding tray 250 can hold multiple sheets. The printer unit 130 may include multiple sheet feeding cassettes and manual sheet feeding trays, or may include at least one of a sheet feeding cassette and a manual sheet feeding tray. The present exemplary embodiment will describe the MFP 100 including four sheet feeding cassettes and one manual sheet feeding tray.

In the printer unit 130, a sheet is fed from one of the sheet feeding cassettes 251 to 254 and the manual sheet feeding tray 250, and the toner applied to the photosensitive drums 223 to 226 is transferred onto the sheet. Thereafter, the sheet is conveyed to a fixing unit 233 to fix the toner onto the sheet by heat and pressure. The temperature of the fixing unit and the sheet transfer speed are controlled based on attribute information such as the grammage of a sheet stored in the HDD 160 as setting values of the sheet holding units configured to feed sheets. The sheet having passed through the fixing unit 233 is discharged to a sheet output tray 236 by conveying rollers 234 and 235.

In the MFP that does not include the sheet output tray 236 as a sheet output unit, the sheet having passed through the fixing unit 233 may be discharged within its body part being a sheet output unit.

While the present exemplary embodiment describes a case where the color printer including four photosensitive drums and four development units is used, in another embodiment, a monochrome printer including one photosensitive drum and one development unit can be used. Further, while the present exemplary embodiment describes the electrophotographic method of printing an image on a sheet, an inkjet method or any other method by which an image can be printed may be used.

In the present exemplary embodiment, a print job is input from the PC 101 to the MFP 100 using a print function of an arbitrary application, a printer driver, etc.

For example, the user can designate the MFP 100 (a printer name 301) to be used to execute a print job on a printer driver screen 300, which is illustrated in FIG. 3A, displayed on an operation unit (not illustrated) of the PC 101. Further, the user can designate, for example, a color mode, sheet size, number of copies, finishing, etc. as a print setting 302. Further, the user can designate as an output mode 303 of a print job, for example, "print," "secure print," "encrypted secure print," "save," "hold," etc.

In a case where, for example, "print" is designated as the output mode 303, print data such as PDL data reflecting the print setting 302 designated by a printing style designation function provided by the printer driver is generated. Then, a print job associated with user information (e.g., login name of the PC 101, authenticated user identification (ID), etc.) is sent to the MFP 100 designated by the user. Examples of the user information to be associated with the print job are the login name of the PC 101 and the authenticated user ID. Alternatively, a confirmation window 310 illustrated in FIG. 3B may be displayed on the operation unit (not illustrated) of the PC 101 at the press of an OK button 304 on the printer driver screen 300 in FIG. 3A by the user. In this case, a user name 311 input by the user on the confirmation window 310 may be associated with the print job. Then, the MFP 100 receives the print job associated with the user information, and executes printing.

In the case where, for example, "save" or "hold" is designated as the output mode 303, print data such as PDL data reflecting the print setting 302 is generated. Then, the print job associated with the user information is sent to the MFP 100 designated by the user. Thereafter, the MFP 100 receives the print job associated with the user information, and stores the received print job in the HDD 160.

In the case where, for example, "secure print" is designated as the output mode 303, for example, the confirmation window 310 illustrated in FIG. 3B prompts the user to input the user name 311 and a password 312. Then, print data such as PDL data reflecting the print setting 302 is generated. Thereafter, the print job associated with the user information including the password is sent to the MFP 100 designated by the user. Then, the MFP 100 receives the print job associated with the user information including the password, and stores the received print job in the HDD 160.

In the case where, for example, "encrypted secure print" is designated as the output mode 303, for example, the confirmation window 310 illustrated in FIG. 3B prompts the user to input the user name 311 and the password 312. Then, print data such as PDL data reflecting the print setting 302 is generated. Thereafter, the print data is encrypted, and the print job associated with the user information including the password is sent to the MFP 100 designated by the user. Then, the MFP 100 receives the print job associated with the user information including the password, and stores the received print job in the HDD 160.

The following describes in detail a process for storing in the HDD 160 bibliographic information and print data of a received job in the MFP 100 according to the present exemplary embodiment with reference to the flowchart illustrated in FIG. 4. The CPU 111 of the controller unit 110 executes a PDL function program read from the ROM 115 or the HDD 160 and developed in the RAM 114 to carry out the process.

In step S401, the CPU 111 determines whether a job has been received via the external I/F 140. A job to be received in step S401 is, for example, a job input from the PC 101 to the MFP 100 via the printer driver screen 300 illustrated in FIG. 3A described above. As a result of the determination in step S401, if the CPU 111 determines that a job has been received (YES in step S401), the processing proceeds to step S402. On the other hand, step S401 is repeated until a job has been received.

In step S402, the CPU 111 determines whether a forcible reservation setting of the MFP 100 having received the job in step S401 is on. Whether to set the forcible reservation setting on or off can be determined arbitrarily for each MFP 100 by the user (administrator). The forcible reservation refers to forcible storage of a received print job in the HDD 160 in a case where the print job associated with user information is received. Specifically, in a case where the forcible reservation setting is on, even if, for example, "print" is designated as the output mode 303 of the printer driver, a job input to the MFP 100 is forcibly stored in the HDD 160.

As a result of the determination in step S402, if the CPU 111 determines that the forcible reservation setting is on (YES in step S402), the processing proceeds to step S403. On the other hand, in step S402, if the CPU 111 determines that the forcible reservation setting is not on (NO in step S402), the processing proceeds to step S410.

In step S403, the CPU 111 analyzes the setting of the job received in step S401, and determines whether the job is a forcible reservation target (i.e., whether the job is to be forcibly stored in the HDD 160). For example, in a case where information about the user having input the job is not specified (not set), even if the forcible reservation setting of the MFP 100 having received the job is on, the job may be excluded from the forcible reservation target. Further, for example, in a case where information about the user having input the job indicates a specific user, even if the forcible reservation setting of the MFP 100 having received the job is on, the job may be excluded from the forcible reservation target. Furthermore, for example, in a case where an IP address of a job input source is a specific IP address, even if the forcible reservation setting of the MFP 100 having received the job is on, the job may be excluded from the forcible reservation target. Various types of conditions for setting a job as a forcible reservation target may be configured to be arbitrarily settable by the user (administrator).

As a result of the determination in step S403, if the CPU 111 determines that the job is a forcible reservation target (YES in step S403), the processing proceeds to step S404. On the other hand, in step S403, if the CPU 111 determines that the job is not a forcible reservation target (NO in step S403), the processing proceeds to step S410.

In step S404, the CPU 111 analyzes an attribute of the received job, and determines whether bibliographic information has been successfully extracted therefrom.

The bibliographic information refers to, for example, a date/time 501 of the receipt of the job, a storage location 502 (IP address, path, job name, etc.) of the received job, and a print setting 503 (color mode, sheet size, number of copies, finishing, etc.) of the received job.

There may be a case where multiple MFPs 100 are communicably connected via a network such as the LAN 102. In this case, the MFP 100 for storing print data of the received job (the MFP 100 will be referred to as a "storage apparatus"), the MFP 100 for registering (storing) the bibliographic information (the MFP 100 will be referred to as a "bibliography server apparatus"), and the MFP 100 for executing the job (the MFP 100 will be referred to as an "output apparatus") may be different from one another. Thus, the storage location (IP address and path) of the received job is managed in the bibliographic information.

As a result of the determination in step S404, if the CPU 111 determines that the bibliographic information has been successfully extracted (YES in step S404), the processing proceeds to step S405. On the other hand, if the CPU 111 determines that the bibliographic information has not been successfully extracted (NO in step S404), the process illustrated in FIG. 4 ends. A case where the bibliographic information has not been successfully extracted is a case where, for example, a job for which no user information has been set is input and, therefore, an attribute of the job cannot be analyzed. When the CPU 111 determines in step S404 that the bibliographic information has not been successfully extracted, the process illustrated in FIG. 4 may end after notification of the unsuccessful extraction of the bibliographic information is made to the user.

In step S405, the CPU 111 stores in the HDD 160 print data extracted from the job received in step S401, and then the processing proceeds to step S406. The print data is PDL data or the like generated by reflecting the print setting 302 designated by the printing style designation function provided by the printer driver.

In step S406, the CPU 111 determines whether the print data has been successfully stored in the HDD 160. As a result of the determination in step S406, if the CPU 111 determines that the print data has been successfully stored in the HDD 160 (YES in step S406), the processing proceeds to step S407. On the other hand, in step S406, if the CPU 111 determines that the print data has not been successfully stored in the HDD 160 (NO in step S406), the processing proceeds to step S409. Examples of a case where print data has not been successful stored include a case where the free space of the HDD 160 is not enough to store the print data, a case where the file size of print data to be stored in the HDD 160 exceeds the file size of print data that can be stored in the HDD 160, and a case where the number of jobs to be stored in the HDD 160 exceeds the upper limit of the number of jobs that can be stored in the HDD 160 per user.

In step S407, the CPU 111 stores in the HDD 160 the bibliographic information extracted from the job received in step S401, and then the processing proceeds to step S408.

In step S408, the CPU 111 determines whether the bibliographic information has been successfully stored in the HDD 160. As indicated by the bibliographic information table 500 in FIG. 5A, the bibliographic information stored in the HDD 160 is managed for each user having input the job based on a user name 504. In the example of the bibliographic information table 500 in FIG. 5A, bibliographic information for UserA, bibliographic information for UserB, and bibliographic information for UserC are managed. For example, the bibliographic information table 500 indicates that a job (job name: "AAA.ppt") input to the MFP 100 by UserA was received on "Apr. 10, 2012, 10:34:45." Further, as to the storage location of the job, the bibliographic information table 500 indicates that the IP address is "192.168.2.11" and the path is "/printdata/0015/xxx." Furthermore, the bibliographic information table 500 indicates that the print settings of the job are A3, full color, staple finishing (upper left), and 100 copies to be printed.

As a result of the determination in step S408, if the CPU 111 determines that the bibliographic information has been successfully stored (YES in step S408), it is considered that the received job has been successfully stored in the HDD 160. Then, the process illustrated in FIG. 4 ends. On the other hand, in step S408, if the CPU 111 determines that the bibliographic information has not been successfully stored (NO in step S408), the processing proceeds to step S409. A case where the bibliographic information has not been successfully stored is, for example, a case where the free space of the HDD 160 is not enough to store the bibliographic information.

In step S409, the CPU 111 registers the user information associated with the job received in step S401 in the error information table 510, which is illustrated in FIG. 5B, stored in the RAM 114. The error information table 510 stored in the RAM 114 manages information about the user (a user name 511) having input the job that has not been successfully stored in the HDD 160. The error information table 510 illustrated in FIG. 5B as an example indicates that a job input by UserA and a job input by UserC have not been successfully stored. The process illustrated in FIG. 4 ends after the process of step S409.

In step S410, the CPU 111 determines whether the output mode of the job received in step S401 is "print." The output mode of a job is determined by the output mode 303 designated by the printer driver. As a result of the determination in step S410, if the CPU 111 determines that the output mode is "print" (YES in step S410), the processing proceeds to step S411. On the other hand, in step S410, if the CPU 111 determines that the output mode is not "print" (NO in step S410), the processing proceeds to step S412. Cases where the CPU 111 determines in step S410 that the output mode is not "print" are cases where, for example "secure print," "encrypted secure print," "store," "hold," etc. is designated as the output mode of the job received in step S401.

In step S411, the CPU 111 requests execution of the job received in step S401, and executes printing based on the print setting 302 (e.g., color mode, sheet size, number of copies, finishing, etc.) designated by the printer driver. At the time of the execution of printing, the printer unit 130 controls the temperature of the fixing unit and the sheet transfer speed based on the attribute information such as the sheet grammage stored in the HDD 160 as the setting values of the sheet holding unit. The process illustrated in FIG. 4 ends after the process of step S411.

In step S412, the CPU 111 requests execution of the job received in step S401, and stores the job in the HDD 160. The process illustrated in FIG. 4 ends after the process of step S412.

The foregoing describes in detail the process for storing bibliographic information and print data of the received job in the HDD 160 in the MFP 100 according to the first exemplary embodiment.

While the foregoing describes the case where the received job is forcibly stored in the HDD 160 in the case where the forcible reservation setting of the MFP 100 having received the job is set on, this is not a limiting case. For example, there may be a case where a job can be input to the MFP 100 with the "forcible reservation setting" designated as the output mode 303 of the printer driver. In this case, the received job may be forcibly stored in the HDD 160 even if the forcible reservation setting of the MFP 100 having received the job is off.

Figure 6:
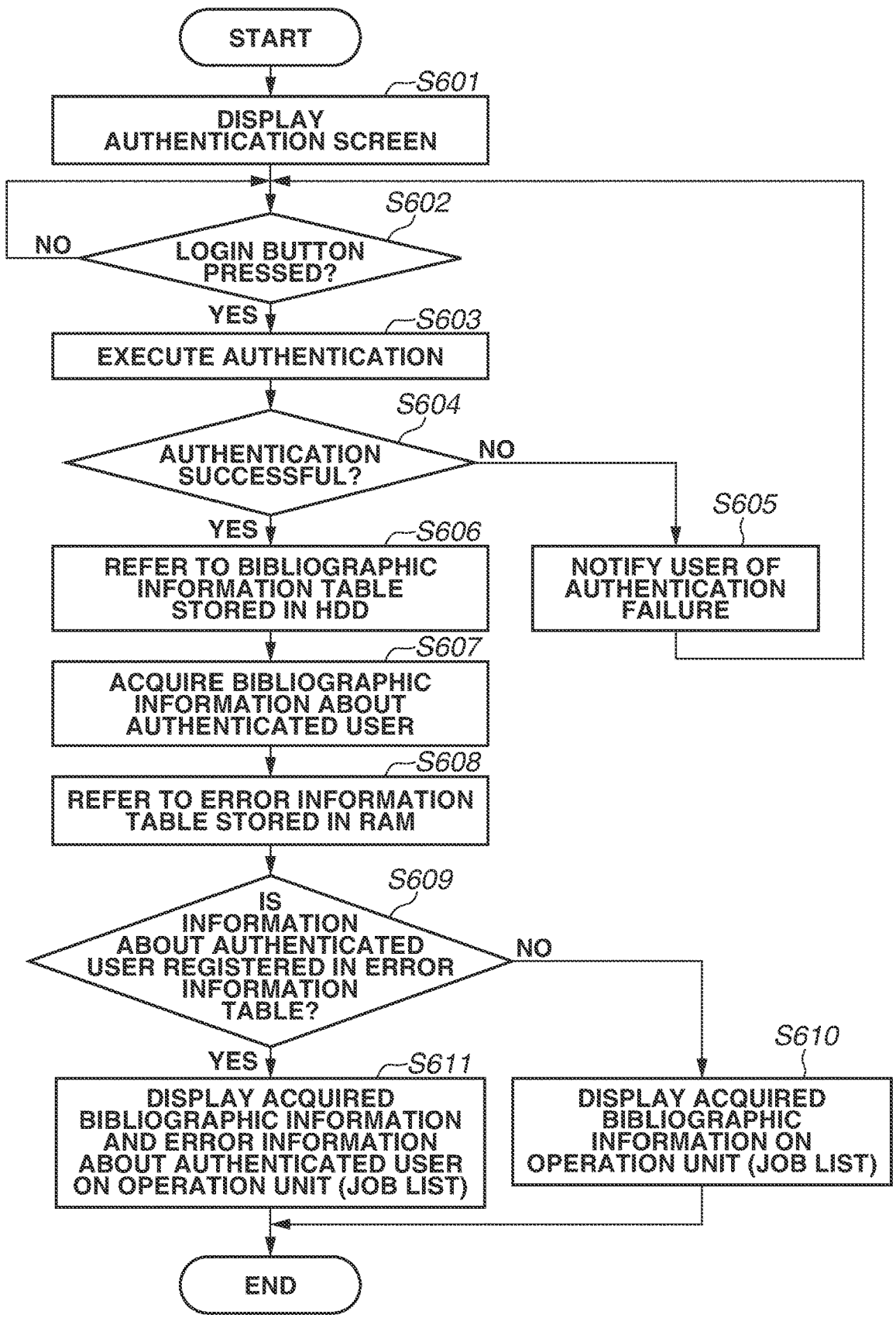
FIG. 6 is a flowchart illustrating a control example according to the first exemplary embodiment.

The following describes in detail a process for displaying a job list of an authenticated user in the MFP 100 according to the first exemplary embodiment with reference to the flowchart illustrated in FIG. 6. The CPU 111 of the controller unit 110 executes a UI function program read from the ROM 115 or the HDD 160 and developed in the RAM 114 to carry out the process. As indicated by a job list screen 800 in FIG. 8A, the job list shows bibliographic information about the jobs stored in the HDD 160 that is displayed on the operation unit 150. The user can select an arbitrary job from the job list screen 800 illustrated in FIG. 8A, and gives an instruction to execute the selected job.

Figure 7:
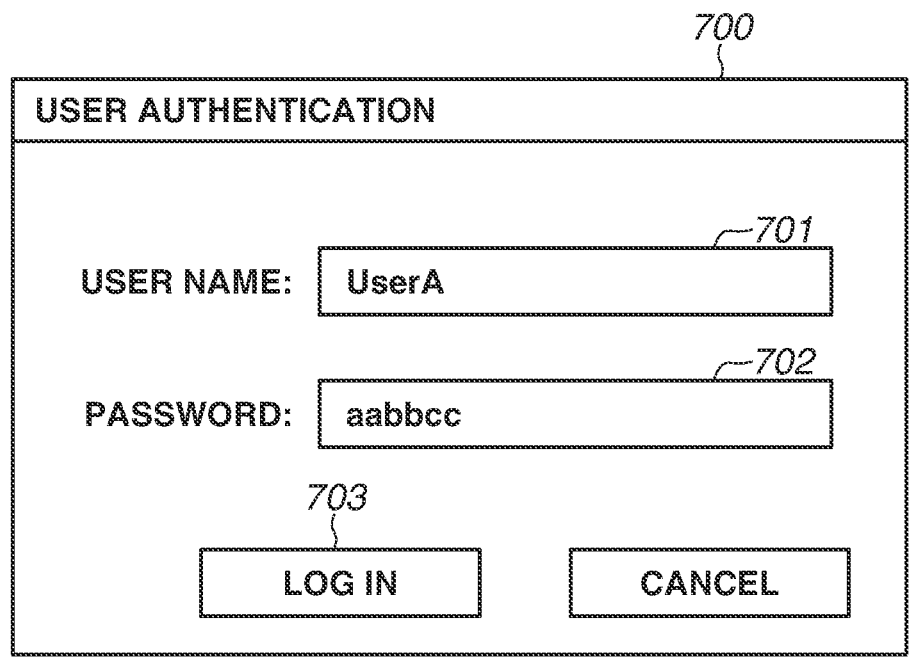
FIG. 7 illustrates a screen according to the first exemplary embodiment.

In step S601, the CPU 111 displays on the operation unit 150 an authentication screen 700, which is illustrated in FIG. 7, for logging in to the MFP 100, and then the processing proceeds to step S602.

In step S602, the CPU 111 determines whether the user inputs predetermined user information (e.g., a user name 701 and a password 702), and presses a login button 703 on the authentication screen 700. If the CPU 111 determines that the login button 703 is pressed (YES in step S602), the processing proceeds to step S603. Step S602 is repeated until the login button 703 is pressed.

In step S603, the CPU 111 executes authentication by collating authentication information such as the user name and the password stored in the HDD 160 based on the user information input on the authentication screen 700 by the user, and then the processing proceeds to step S604.

In step S604, the CPU 111 determines whether the authentication executed in step S603 is successful. If the CPU 111 determines that the authentication is successful (YES in step S604), the processing proceeds to step S606. On the other hand, in step S604, if the CPU 111 determines that the authentication is not successful (NO in step S604), the processing proceeds to step S605.

In step S605, the CPU 111 notifies the user of the authentication failure, and the processing returns to step S602.

In step S606, the CPU 111 refers to the bibliographic information table 500, which is illustrated in FIG. 5A, stored in the HDD 160, and the processing proceeds to step S607. At the time of referring to the bibliographic information table 500, the user name 701 of the authenticated user is searched for using as a key the user name 504 registered in the bibliographic information table 500. As a result of the search, the user name 504 and the user name 701 are compared, and only the bibliographic information about the authenticated user is referred to.

In step S607, the CPU 111 acquires the bibliographic information about the authenticated user based on the result referred to in step S606, and the processing proceeds to step S608. In the bibliographic information table 500 illustrated in FIG. 5 as an example, in a case where the user name 701 of the authenticated user is "UserA," only the bibliographic information with the user name 504 of "UserA" is acquired among all the bibliographic information registered in the bibliographic information table 500.

In step S608, the CPU 111 refers to the error information table 510 stored in the RAM 114, and the processing proceeds to step S609. At the time of referring to the error information table 510, the user name 701 of the authenticated user is searched for using as a key the user name 511 registered in the error information table 510.

In step S609, the CPU 111 determines whether information (user name) about the authenticated user is registered in the error information table 510 based on the result referred to in step S608. As a result of the determination in step S609, if the CPU 111 determines that the information is registered (YES in step S609), the processing proceeds to step S611. On the other hand, in step S609, if the CPU 111 determines that the information is not registered (NO in step S609), the processing proceeds to step S610.

In step S610, the CPU 111 displays on the operation unit 150 (job list) the bibliographic information (i.e., the bibliographic information about the authenticated user) acquired in step S607. For example, as indicated in the job list screen 800 in FIG. 8A, the bibliographic information about each job input to the MFP 100 by the authenticated user (UserA) and successfully stored in the HDD 160 is displayed on the job list. The process illustrated in FIG. 6 ends after the process of step S610.

In step S611, the CPU 111 displays on the operation unit 150 (job list) the bibliographic information (i.e., the bibliographic information about the authenticated user) acquired in step S607 and the error information about the authenticated user. For example, as indicated by a job list screen 810 in FIG. 8B, the bibliographic information about each job input to the MFP 100 by the authenticated user (UserA) and successfully stored in the HDD 160 is displayed on the job list. Further, a message 803 to notify the user of storage error information relating to the authenticated user (i.e., there is a job that was input to the MFP 100 by the authenticated user and was not successfully stored at the time of receipt) is displayed on the job list screen 810 illustrated in FIG. 8B. The process illustrated in FIG. 6 ends after the process of step S611.

The foregoing describes in detail the process for displaying the job list of the authenticated user on the MFP 100 according to the first exemplary embodiment.

While the foregoing describes the case where the authentication for logging in to the MFP 100 is executed based on the user information input by the user on the authentication screen 700 illustrated in FIG. 7 in steps S601 to S604, this is not a limiting case. The authentication may be executed at the time of logging in to the MFP 100 by reading the user information such as the user ID and the password registered in advance on an integrated circuit (IC) card.

While FIG. 8B illustrates the exemplary case where the message 803 is displayed on the job list screen 810 illustrated in FIG. 8B to notify the user of the storage error information about the authenticated user in step S611, this is not a limiting case. The notification of the storage error information about the authenticated user may be provided in any other form from which the user can easily recognize that there is a job that was input by the authenticated user and was not successfully stored at the time of receipt. For example, a pop-up screen (not illustrated) may be displayed on the operation unit 150 to notify the user of the storage error information about the authenticated user. Alternatively, other identifiable marks, sound, or light may be used to notify the user of the storage error information about the authenticated user. Further, a notification of detailed information (e.g., job name, date/time of job receipt, reason of unsuccessful storage of the job, etc.) about the job that was not successfully stored at the time of receipt may also be provided on the job list screen 810 illustrated in FIG. 8B as the storage error information about the authenticated user.

The following describes in detail a process for executing a job stored in the HDD 160 in the MFP 100 according to the first exemplary embodiment. The CPU 111 of the controller unit 110 executes a PDL function program read from the ROM 115 or the HDD 160 and developed in the RAM 114 to carry out the process. The process starts with the job list being displayed on the operation unit 150.

In step S901, the CPU 111 determines whether an instruction to execute a job stored in the HDD 160 has been received. For example, when the user selects arbitrary bibliographic information from the list of bibliographic information about each job displayed on the job list screen 810 in FIG. 8B and presses a print start button 802, an instruction to execute the job can be received. As a result of the determination in step S901, if the CPU 111 determines that a job execution instruction has been received (YES in step S901), the processing proceeds to step S902. Step S901 is repeated until a job execution instruction has been received.

In step S902, the CPU 111 analyzes the bibliographic information about the job for which the job execution instruction has been received in step S901, and then the processing proceeds to step S903.

In step S903, the CPU 111 acquires from the HDD 160 print data of the job for which the job execution instruction has been received in step S901, and then the processing proceeds to step S904.

In step S904, the CPU 111 executes the job for which the job execution instruction has been received in step S901 based on the bibliographic information (e.g., print setting information) analyzed in step S902 and the print data acquired in step S903, and then the processing proceeds to step S905.

In step S905, the CPU 111 refers to the error information table 510 stored in the RAM 114, and then the processing proceeds to step S906. At the time of referring to the error information table 510, the user name 701 of the authenticated user is searched for using as a key the user name 511 registered in the error information table 510.

Figure 9:
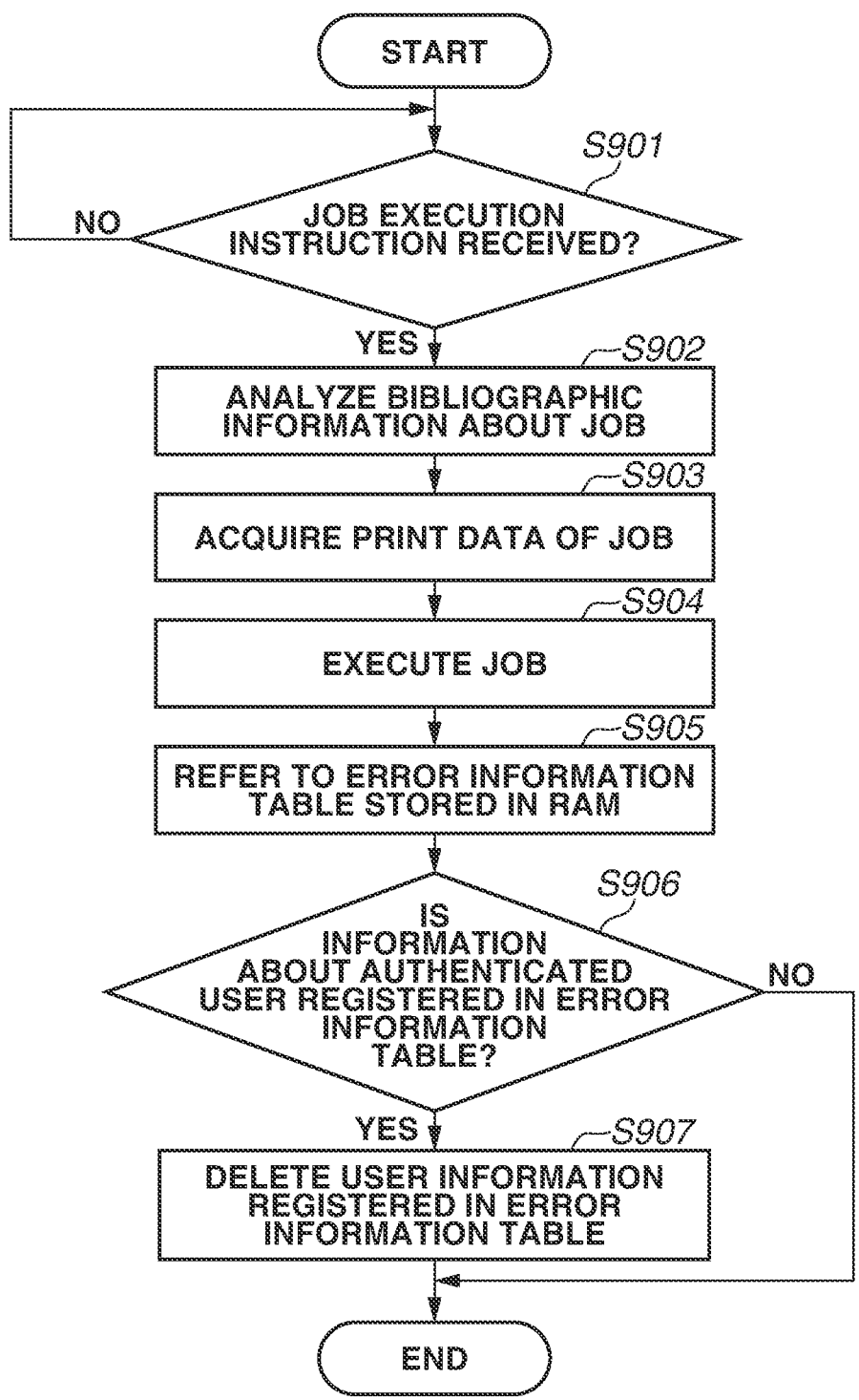
FIG. 9 is a flowchart illustrating a control example according to the first exemplary embodiment.

In step S906, the CPU 111 determines whether information (user name) about the authentication user is registered in the error information table 510 based on the result referred to in step S905. As a result of the determination in step S906, if the CPU 111 determines that the information is registered (YES in step S906), the processing proceeds to step S907. On the other hand, in step S906, if the CPU 111 determines that the information is not registered (NO in step S906), the process illustrated in FIG. 9 ends.

In step S907, the CPU 111 deletes the information (user name) about the authenticated user among all the user information (user name) registered in the error information table 510. For example, in a case where the user name of the authenticated user is "UserA," "UserA" registered in the error information table 510 is deleted. The message 803 of the error information displayed on the job list screen 800 in FIG. 8B may be deleted according to the deletion of the error information about the authenticated user from the error information table 510. The process illustrated in FIG. 9 ends after the process of step S907.

The foregoing describes details of the process for executing the job stored in the HDD 160 in the MFP 100 according to the first exemplary embodiment.

While the foregoing describes the case where the error information about the authenticated user is deleted from the error information table 510 when the job stored in the HDD 160 is executed following the receipt of the instruction to execute the job, this is not a limiting case. For example, the error information about the authenticated user may be deleted from the error information table 510 when arbitrary bibliographic information is selected among all the bibliographic information of the jobs displayed on the job list screen 810 in FIG. 8B. Alternatively, the error information about the authenticated user may be deleted from the error information table 510 when a predetermined time has elapsed since the display of the message 803 of the storage error information on the job list screen 810 in FIG. 8B was performed. Alternatively, the CPU 111 may delete the error information about the authenticated user from the error information table 510 when the user logs out from the MFP 100. Specifically, it is also possible to arrange such that the message 803 of the error information about the authenticated user is not displayed on the job list screen 810 in FIG. 8B when the authenticated user logs in to the MFP 100 again after logging out from the MFP 100.

As described above, according to the first exemplary embodiment, in the case where a job associated with user information has been received and the received job has not been successfully stored, the user information is registered in the error information table 510. Then, when the user is authenticated, the user is notified that there is a job that was not successfully stored among the jobs input by the authenticated user. In this way, jobs input by other users are excluded from consideration, and the authenticated user can check whether there is a job that was not successfully stored only among the jobs input by the authenticated user. This significantly improves user convenience.

In the first exemplary embodiment described above, the case where authentication for logging in to the MFP 100 has been considered. The case described above is as follows. When a job associated with user information has been received and the received job has not been successfully stored, the user information is registered in the error information table 510 stored in the RAM 114. Then, when the user is authenticated, the user is notified that there is a job that was not successfully stored among the jobs input by the authenticated user.

In a second exemplary embodiment, a case where authentication for logging in to the MFP 100 is not executed will be considered. In a case where a job associated with user information has been received and the received job has not been successfully stored, the CPU 111 registers storage unsuccessful information in a bibliographic information table (FIG. 11) stored in the HDD 160. On the other hand, in a case where the received job has been successfully stored, the CPU 111 registers storage successful information in the bibliographic information table. Then, when the job list is displayed, the user is notified of the job that has not been successfully stored and the job that has been successfully stored such that each of the jobs is associated with user information. This case will be described below as the second exemplary embodiment.

The MFP 100 according to the second exemplary embodiment is differentiated from a part of the processes of the first exemplary embodiment (FIG. 4) for storing bibliographic information and print data of a received job in the HDD 160. The following mainly describes steps that are different from those in the first exemplary embodiment, with reference to FIG. 10. Steps that are similar to those in the first exemplary embodiment are given the same step numbers, and description of the steps is omitted. In the second exemplary embodiment, as indicated in a bibliographic information table 1100 illustrated in FIG. 11, a user name (information) 1101 and a storage result 1102 are also registered in addition to the date/time 501, the storage location 502, and the print setting 503 as bibliographic information. The storage result 1102 refers to information about whether a received job has been successfully stored in the HDD 160.

Figure 10:
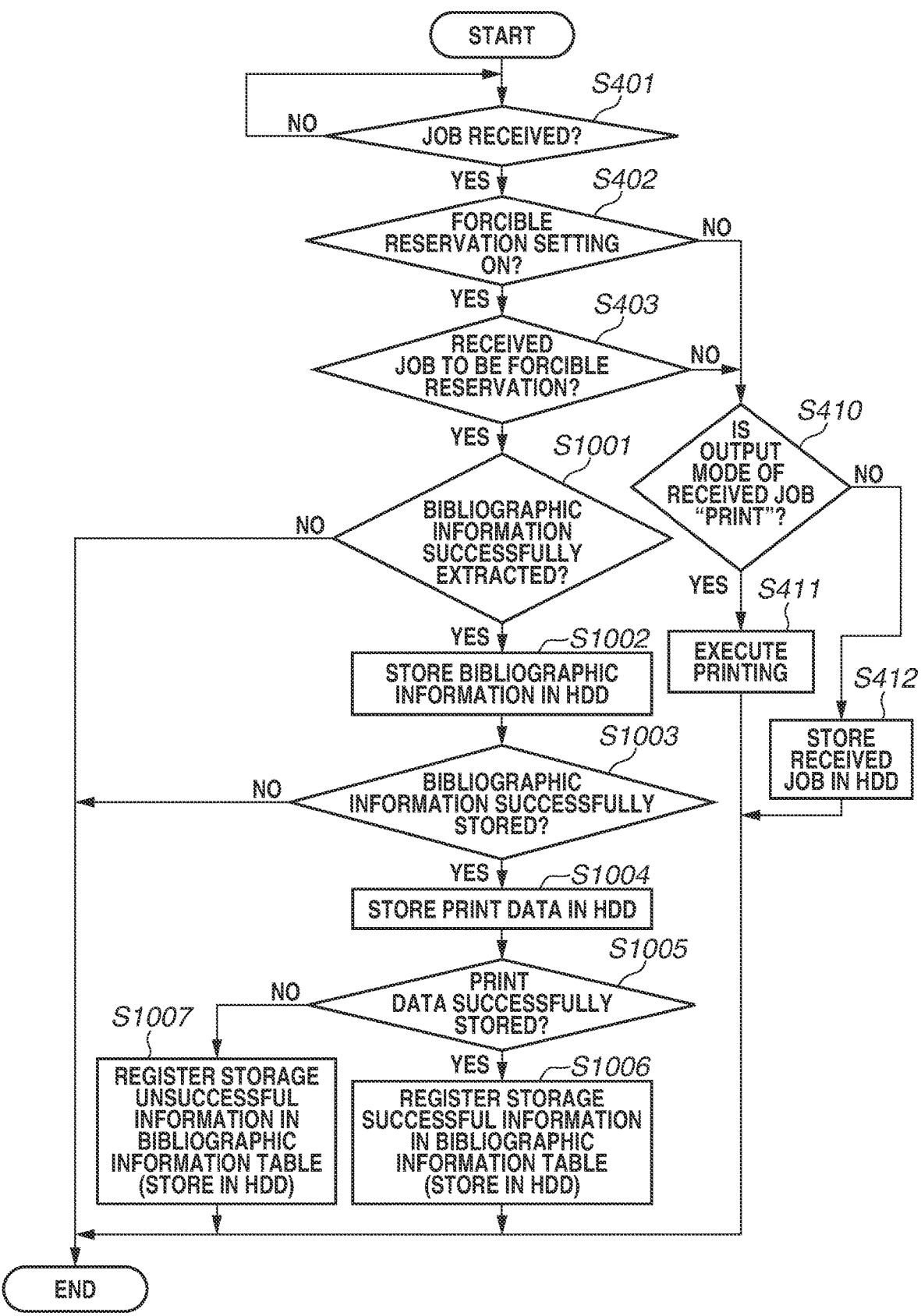
FIG. 10 is a flowchart illustrating a control example according to a second exemplary embodiment.

As illustrated in FIG. 10, in step S403, if the CPU 111 determines that the job received in step S401 is a forcible reservation target (YES in step S403), the processing proceeds to step S1001.

In step S1001, the CPU 111 analyzes an attribute of the received job and determines whether the bibliographic information has been successfully extracted. The process of step S1001 corresponds to that of step S404 in FIG. 4 described in the first exemplary embodiment. As a result of the determination in step S1001, if the CPU 111 determines that the bibliographic information has been successfully extracted (YES in step S1001), the processing proceeds to step S1002. On the other hand, in step S1001, if the CPU 111 determines that the bibliographic information has not been successfully extracted (NO in step S1001), the process illustrated in FIG. 10 ends. When the CPU 111 determines that the bibliographic information has not been successfully extracted, the process illustrated in FIG. 10 may end after notification of the unsuccessful extraction of the bibliographic information is made to the user.

In step S1002, the CPU 111 stores in the HDD 160 the bibliographic information extracted from the job received in step S401, and then the processing proceeds to step S1003. The process of step S1002 corresponds to that of the step S407 in FIG. 4 described above in the first exemplary embodiment.

In step S1003, the CPU 111 determines whether the bibliographic information has been successfully stored in the HDD 160. The process of step S1003 corresponds to that of step S408 in FIG. 4 described above in the first exemplary embodiment. As a result of the determination in step S1003, if the CPU 111 determines that the bibliographic information has been successfully stored (YES in step S1003), the processing proceeds to step S1004. On the other hand, in step S1003, if the CPU 111 determines that the bibliographic information has not been successfully stored (NO in step S1003), the process illustrated in FIG. 10 ends. When the CPU 111 determines in step S1003 that the bibliographic information has not been successfully stored, the process illustrated in FIG. 10 may end after notification of the unsuccessful storage of the bibliographic information is made to the user.

In step S1004, the CPU 111 stores in the HDD 160 print data extracted from the job received in step S401, and then the processing proceeds to step S1005. The process of step S1004 corresponds to that of step S405 in FIG. 4 described above in the first exemplary embodiment.

In step S1005, the CPU 111 determines whether the print data has been successfully stored in the HDD 160. The process of step S1005 corresponds to that of step S406 in FIG. 4 described above in the first exemplary embodiment. As a result of the determination in step S1005, if the CPU 111 determines that the print data has been successfully stored (YES in step S1005), the processing proceeds to step S1006. On the other hand, in step S1005, if the CPU 111 determines that the print data has not been successfully stored (NO in step S1005), the processing proceeds to step S1007.

In step S1006, storage successful information (OK) is registered in the bibliographic information table 1100 stored in the HDD 160. The "storage successful" indicates that the received job has been successfully stored in the HDD 160. For example, as indicated in the bibliographic information table 1100 in FIG. 11, OK (storage successful) is registered as the storage result 1102 of the job (job name: DDD.txt) input by UserB. The process illustrated in FIG. 10 ends after the process of step S1006.

In step S1007, storage unsuccessful information (NG) is registered in the bibliographic information table 1100 stored in the HDD 160. The "storage unsuccessful" indicates that the received job has not been successfully stored in the HDD 160. For example, as indicated in the bibliographic information table 1100 in FIG. 11, NG (storage unsuccessful) is registered as the storage result 1102 of the job (job name: EEE.jpg) input by UserC. The process illustrated in FIG. 10 ends after the process of step S1007.

The foregoing describes in detail the steps different from those in the first exemplary embodiment among the steps included in the process for storing bibliographic information and print data of a received job in the HDD 160 in the MFP 100 according to the second exemplary embodiment.

The following describes in detail a process for displaying a job list in the MFP 100 according to the second exemplary embodiment with reference to the flowchart illustrated in FIG. 12. The CPU 111 of the controller unit 110 executes a UI function program read from the ROM 115 or the HDD 160 and developed in the RAM 114 to carry out the process.

Authentication for logging in to the MFP 100 is not executed in the MFP 100 according to the second exemplary embodiment described below. In the job list in the second exemplary embodiment, jobs for which bibliographic information has been successfully stored are listed such that a storage result 1302 of each of the jobs (print data) is associated with a user name (information) 1301, as indicated in a job list screen 1300 illustrated in FIG. 13. The job list screen 1300 illustrated in FIG. 13 is displayed on the operation unit 150.

In step S1201, the CPU 111 determines whether a job list display instruction has been received. The job list screen 1300 illustrated in FIG. 13 is invoked, for example, at the press of a button (not illustrated) displayed on the operation unit 150 by the user. As a result of the determination in step S1201, if the CPU 111 determines that a display instruction has been received (YES in step S1201), the processing proceeds to step S1202. Step S1201 is repeated until a display instruction has been received.

In step S1202, the CPU 111 refers to the bibliographic information table 1100, which is illustrated in FIG. 11, stored in the HDD 160 and acquires all the bibliographic information, and then the processing proceeds to step S1203. In step S1202, the user name 1101 and the storage result 1102 are acquired in addition to the date/time 501, the storage location 502, and the print setting 503 as bibliographic information.

In step S1203, the CPU 111 displays on the operation unit 150 (job list) the bibliographic information acquired in step S1202. For example, as indicated in the job list screen 1300 in FIG. 13, the storage result 1302 of the job input to the MFP 100 by UserA and given the job name "AAA.ppt" is "unsuccessful" (NG). On the other hand, the storage result 1302 of the job input to the MFP 100 by UserA and given the job name "BBB.txt" is "successful" (OK). Thus, the user can select a job with the storage result 1302 that is "successful" (OK), and give an instruction to execute the job. With regard to a job with the storage result 1302 that is "unsuccessful" (NG), the user may change the settings of the job and the like, and then input the job again from the PC 101 to the MFP 100. The process illustrated in FIG. 12 ends after the process of step S1203.

The foregoing describes in detail the process for displaying the job list on the MFP 100 according to the second exemplary embodiment. While the foregoing describes the exemplary case where "OK" is displayed to indicate that the received job has been successfully stored and "NG" is displayed to indicate that the received job has not been successfully stored on the job list screen 1300 in FIG. 13, this is not a limiting case. For example, a pop-up screen (not illustrated) from which the user can easily understand that the job has been successfully stored or not successfully stored may be displayed on the job list screen 1300 to notify the user of the storage result. Alternatively, other identifiable marks, sound, or light may be used to notify the user of the storage result. Further, a notification of detailed information (e.g., reason of unsuccessful storage of the job, etc.) about the job that was not successfully stored at the time of receipt may also be provided as the storage result.

As described above, in the second exemplary embodiment, the storage unsuccessful information (NG) is registered in the bibliographic information table 1100 in the case where a job associated with user information has been received and the received job has not been successfully stored. On the other hand, the storage successful information (OK) is registered in the bibliographic information table 1100 in the case where the received job has been successfully stored.

Then, when the job list is displayed, the user is notified of the job that was not successfully stored and the job that was successfully stored such that each of the jobs is associated with user information. In this way, the user can easily recognize the jobs that were not successfully stored and the jobs that were successfully stored, among the jobs input by the user. This significantly improves user convenience.

In a third exemplary embodiment, a case where authentication for logging in to the MFP 100 is not executed will be considered. In a case where a job associated with user information has been received and the received job has not been successfully stored, storage unsuccessful information is registered in a job history table (FIG. 15) stored in the HDD 160. On the other hand, in a case where the received job has been successfully stored, storage successful information is registered in the job history table. Then, when the job history is displayed, the user is notified of the job that was not successfully stored and the job that was successfully stored such that each of the jobs is associated with user information. This case will be described below as the third exemplary embodiment.

As indicated in a job history table 1500 in FIG. 15, the job history information manages, for example, a date/time 1501 of receipt, a type 1503, and a job name 1504 of a received job as history information about the job from which bibliographic information has been successfully extracted. Further, a department ID 1502 of the user having input the job, a user name (information) 1505 about the user having input the job, and a storage result 1506 of the received job are managed. The job history table 1500 illustrated in FIG. 15 is stored in the HDD 160.

The difference between the MFP 100 according to the third exemplary embodiment and the first exemplary embodiment (FIG. 4) is a part of the processes for storing bibliographic information and print data of a received job in the HDD 160. The following mainly describes steps that are different from those in the first exemplary embodiment, with reference to FIG. 14. Steps that are similar to those in the first and second exemplary embodiments are given the same step numbers, and description of the steps is omitted.

Figure 14:
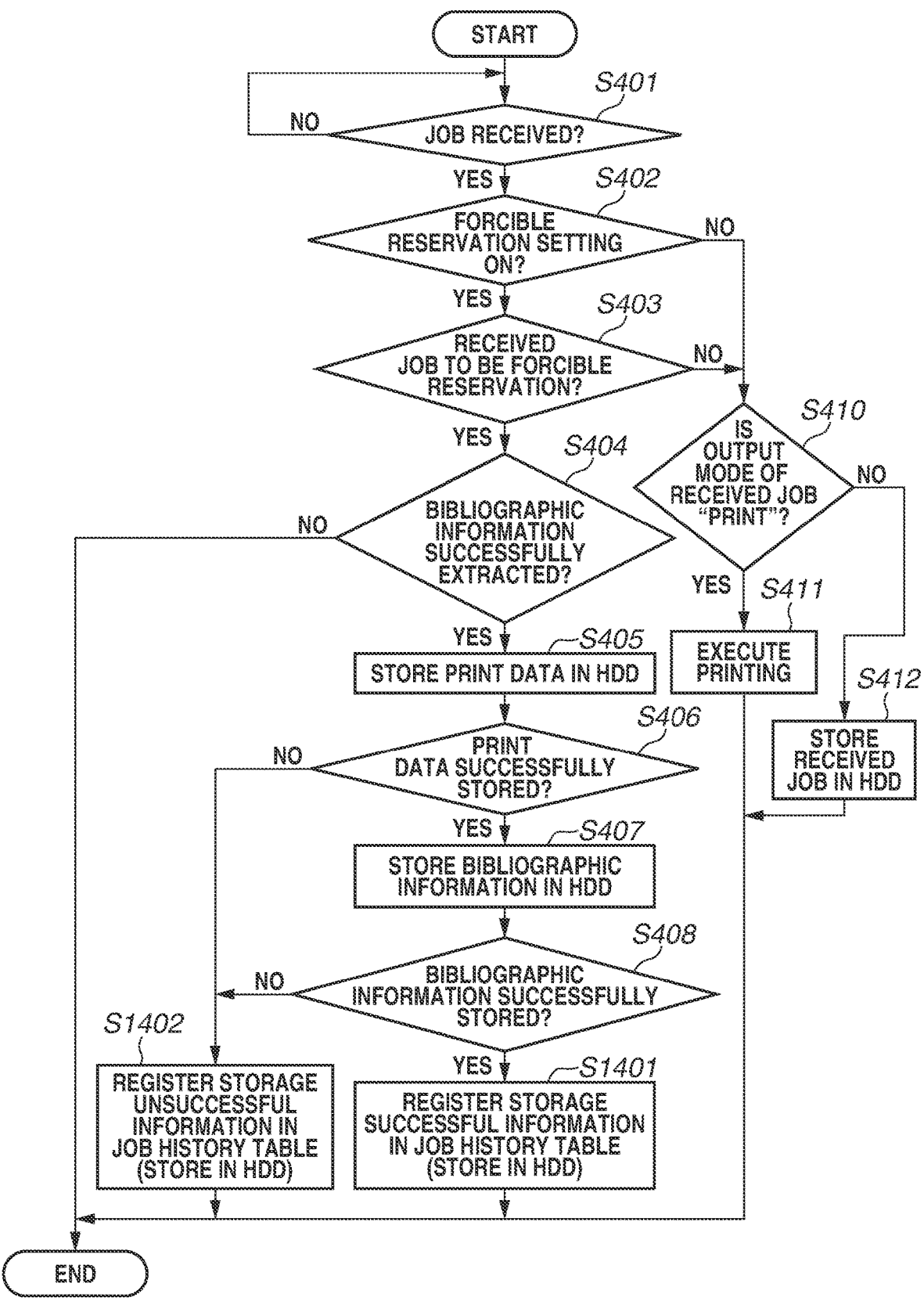
FIG. 14 is a flowchart illustrating a control example according to a third exemplary embodiment.

As illustrated in FIG. 14, in step S406, if the CPU 111 determines that the print data extracted from the job received in step S401 has not been successfully stored (NO in step S406), the processing proceeds to step S1402.

As illustrated in FIG. 14, in step S408, if the CPU 111 determines that the print data extracted from the job received in step S401 has been successfully stored (YES in step S408), the processing proceeds to step S1401. On the other hand, in step S408, if the CPU 111 determines that the print data extracted from the job received in step S401 has not been successfully stored (NO in step S408), the processing proceeds to step S1402.

In step S1401, the storage successful information (OK) is registered in the job history table 1500 stored in the HDD 160. The "storage successful" indicates that the received job has been successfully stored in the HDD 160. For example, as indicated in the job history table 1500 in FIG. 15, OK (storage successful) is registered as the storage result 1506 of the job (job name: DDD.txt) input by UserB. The process illustrated in FIG. 14 ends after the process of step S1401.

In step S1402, storage unsuccessful information (NG) is registered in the job history table 1500 stored in the HDD 160. The "storage unsuccessful" indicates that the received job has not been successfully stored in the HDD 160. For example, as indicated in the job history table 1500 in FIG. 15, NG (storage unsuccessful) is registered as the storage result 1506 of the job (job name: EEE.jpg) input by UserC.

The process illustrated in FIG. 14 ends after the process of step S1402. The foregoing describes in detail the steps different from those in the first exemplary embodiment among the steps included in the process for storing bibliographic information and print data of a received job in the HDD 160 in the MFP 100 according to the third exemplary embodiment.

Figure 16:
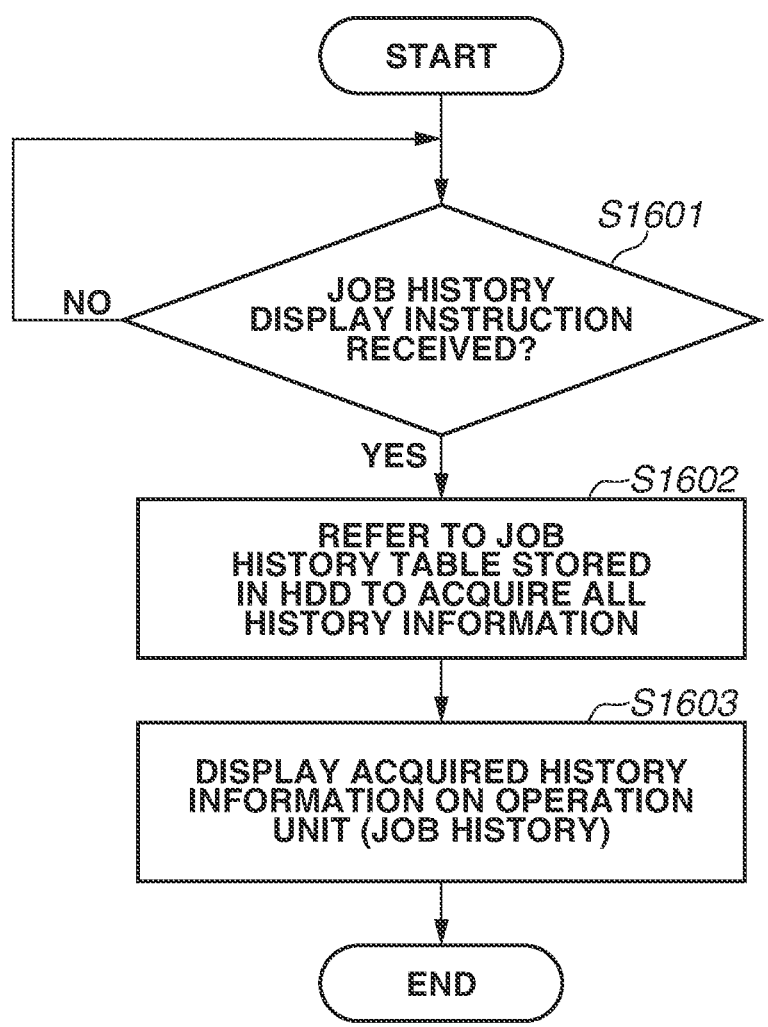
FIG. 16 is a flowchart illustrating a control example according to the third exemplary embodiment.

The following describes in detail a process for displaying the job history on the MFP 100 according to the third exemplary embodiment, with reference to the flowchart illustrated in FIG. 16. The CPU 111 of the controller unit 110 executes a UI function program read from the ROM 115 or the HDD 160 and developed in the RAM 114 to carry out the process. Authentication for logging in to the MFP 100 is not executed in the MFP 100 according to the third exemplary embodiment described below. In the job history in the third exemplary embodiment, a list of history information (e.g., print history information, storage history information) about the jobs from which the bibliographic information has been successfully extracted is displayed such that the history information is associated with a user name (information) 1701, as indicated in a job history screen 1700 in FIG. 17. The job history screen 1700 illustrated in FIG. 17 is displayed on the operation unit 150.

In step S1601, the CPU 111 determines whether a job history display instruction has been received. The job history screen 1700 illustrated in FIG. 17 is invoked, for example, at the press of a button (not illustrated) displayed on the operation unit 150 by the user. As a result of the determination in step S1601, if the CPU 111 determines that a display instruction has been received (YES in step S1601), the processing proceeds to step S1602. Step S1601 is repeated until a display instruction has been received.

In step S1602, the CPU 111 refers to the job history table 1500, which is illustrated in FIG. 15, stored in the HDD 160 and acquires all the history information, and then the processing proceeds to step S1603. In step S1602, the user name 1505 and the storage result 1506 are acquired in addition to the date/time 1501, the department ID 1502, the type 1503, and the job name 1504 as the history information.

In step S1603, the CPU 111 displays on the operation unit 150 (job history) the history information acquired in step S1602. For example, as indicated in the job history screen 1700 in FIG. 17, a (storage) result 1702 of the job input by UserA and given the job name "AAA.ppt" is "unsuccessful" (NG). On the other hand, the storage result 1702 of the job input to the MFP 100 by UserB and given the job name "DDD.txt" is "successful" (OK). Thus, the user can select a job with the storage result 1702 that is "successful" (OK) and give an instruction to execute the job. With regard to a job with the storage result 1702 that is "unsuccessful" (NG), the user may change the settings of the job and the like, and then input the job again from the PC 101 to the MFP 100. The process illustrated in FIG. 16 ends after the process of step S1603.

The foregoing describes in detail the process for displaying the job history in the MFP 100 according to the third exemplary embodiment. While the foregoing describes the exemplary case where "OK" is displayed to indicate that the received job has been successfully stored, and "NG" is displayed to indicate that the received job has not been successfully stored on the job list screen 1700 in FIG. 17, this is not a limiting case. For example, a pop-up screen (not illustrated) from which the user can easily understand that the job has been successfully stored or not successfully stored may be displayed on the job list screen 1700 to notify the user of the storage result. Alternatively, other identifiable marks, sound, or light may be used to notify the user of the storage result. Further, a notification of detailed information (e.g., reason of unsuccessful storage of the job, etc.) about the job that was not successfully stored at the time of receipt may also be provided as the storage result.

As described above, in the third exemplary embodiment, the storage unsuccessful information (NG) is registered in the job history table 1500 in the case where a job associated with user information has been received and the received job has not been successfully stored. On the other hand, the storage successful information (OK) is registered in the job history table 1500 in the case where the received job has been successfully stored.

Then, when the job history is displayed, the user is notified of the job that has not been successfully stored and the job that has been successfully stored such that each of the jobs is associated with user information. In this way, the user can easily recognize the jobs that were not successfully stored and the jobs that were successfully stored, among the jobs input by the user. This significantly improves user convenience.

The foregoing exemplary embodiments are not seen to be limiting, and can be modified in various ways (including organic combinations of the exemplary embodiments), wherein such modifications are not excluded from the scope of the present disclosure.

For example, while the various types of controls described above are performed by the CPU 111 of the controller unit 110 of the MFP 100 in the present exemplary embodiment, a part or all of the various types of controls may be configured to be executable by a print control apparatus such as an external controller that is in a different housing from the MFP 100.

Further, for example, while the present exemplary embodiments describe the case where print data of a received job and bibliographic information about the job are stored in the HDD 160 and the job is executed by a single MFP 100, this is not a limiting case. In a case where multiple MFPs 100 are communicably connected together via a network such as the LAN 102, a storage apparatus for storing print data of a received job and a bibliography server apparatus for registering (storing) bibliographic information about the job may be included. In this case, a CPU 111 of another MFP 100 (output apparatus) may be configured to execute a job by requesting acquisition of print data stored in the storage apparatus and bibliographic information stored in the bibliography server apparatus.

While various examples and exemplary embodiments of the invention are described above, it is to be understood that the spirit and scope of the present disclosure are not limited to a specific description in the specification.

Additional embodiments of the present invention can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

What is claimed is:

1. A printing apparatus comprising:
a display;
a memory storing instructions; and
a processor executing the instructions to:
receive from an external apparatus print data with which user identification information for identifying a user is associated;
store the received print data in a storage device;
store error information in association with the user identification information associated with the received print data in a case where the received print data has not been stored; and
display, on the display, information indicating that the received print data has not been stored in the storage device, in a case where the error information is stored in association with user identification information for identifying a user who is logged in to the printing apparatus, the information is displayed at least a certain timing during a period in which the user is logged in to the printing apparatus.

2. The printing apparatus according to claim 1, wherein the processor further executes the instructions to determine whether the received print data is stored in the storage device, and
wherein the user identification information associated with the received print data is stored in a case where it is determined that the received print data is not stored in the storage device.

3. The printing apparatus according to claim 1, wherein the processor further executes the instructions to delete the stored user identification information after displaying the information indicating that the received print data has not been stored in the storage device.

4. The printing apparatus according to claim 3, wherein, after displaying the information indicating that the received print data has not been stored in the storage device, the stored user identification information is deleted in response to receipt of an instruction to execute print data different from the print data not stored in the storage device from the user.

5. The printing apparatus according to claim 3, wherein, after displaying the information indicating that the received print data has not been stored in the storage device, the stored user identification information is deleted in response to logout of the user from the printing apparatus.

6. The printing apparatus according to claim 3, wherein, after displaying the information indicating that the received print data has not been stored in the storage device, the stored user identification information is deleted in response to a predetermined time having elapsed.

7. The printing apparatus according to claim 1, wherein the processor further executes the instructions to display, on the display, a list of print data stored in association with the user identification information for identifying a user who is logged in to the printing apparatus, and wherein the information indicating that the received print data has not been stored in the storage device is displayed with the list.

8. The printing apparatus according to claim 1, wherein the processor further executes the instructions to receive user identification information for identifying a user, wherein the received print data is stored in the storage device in a case where the user identification information associated with the received print data is received, and wherein the received print data is not stored in the storage device in a case where user identification information is not received.

9. The printing apparatus according to claim 1, wherein the period is a period from login to logout.

10. The printing apparatus according to claim 1, wherein the processor further executes the instructions to determine whether the received print data is stored in the storage device, and wherein the user identification information associated with the received print data is stored in a case where it is determined that the received print data is not stored in the storage device.

11. A control method for a printing apparatus, the control method comprising:

receiving from an external apparatus print data with which user identification information for identifying a user is associated;

storing the received print data in a storage device;

storing error information in association with the user identification information associated with the received print data in a case where the received print data has not been stored; and displaying, on a display of the printing apparatus, information indicating that the received print data has not been stored in the storage device, in a case where the error information is stored in association with user identification information for identifying a user who is logged in to the printing apparatus, the information is displayed at least a certain timing during a period in which the user is logged in to the printing apparatus.

12. A non-transitory computer readable storage medium on which is stored a computer program for making a computer execute a control method for a printing apparatus, the control method comprising:

receiving from an external apparatus a print data with which user identification information for identifying a user is associated;

storing the received print data in a storage device;

storing error information in association with the user identification information associated with the received print data in a case where the received print data has not been stored; and displaying, on a display of the printing apparatus, information indicating that the received print data has not been stored in the storage device, in a case where the error information is stored in association with user identification information for identifying a user who is logged in to the printing apparatus, the information is displayed at least a certain timing during a period in which the user is logged in to the printing apparatus.

13. A printing apparatus comprising:

a display;

a memory storing instructions; and a processor executing the instructions to:

receive from an external apparatus print data with which user identification information for identifying a user is associated;

store the received print data in a storage device;

store the user identification information which is associated with the received print data when the received print data not stored in the storage device; and display, on the display, information indicating that the received print data has not been stored in the storage device, in a case where user identification information for identifying a user who is logged in to the printing apparatus is stored, the information is displayed at least a certain timing during a period in which the user is logged in to the printing apparatus.

14. The printing apparatus according to claim 13, wherein the processor further executes the instructions to delete the stored user identification information after displaying the information indicating that the received print data has not been stored in the storage device.

15. The printing apparatus according to claim 14, wherein, after displaying the information indicating that the received print data has not been stored in the storage device, the stored user identification information is deleted in response to receipt of an instruction to execute print data different from the print data not stored in the storage device from the user.

16. The printing apparatus according to claim 14, wherein, after displaying the information indicating that the received print data has not been stored in the storage device, the stored user identification information is deleted in response to logout of the user form the printing apparatus.

17. The printing apparatus according to claim 14, wherein, after displaying the information indicating that the received print data has not been stored in the storage device, the stored user identification information is deleted in response to a predetermined time having elapsed.

18. The printing apparatus according to claim 13, wherein the processor further executes the instructions to display, on the display, a list of print data stored in association with the user identification information for identifying a user who is logged in to the printing apparatus, and wherein the information indicating that the received print data has not been stored in the storage device is displayed with the list.

19. The printing apparatus according to claim 13, wherein the processor further executes the instructions to receive user identification information for identifying a user, wherein the received print data is stored in the storage device in a case where the user identification information associated with the received print data is received, and wherein the received print data is not stored in the storage device in a case where user identification information is not received.

20. The printing apparatus according to claim 13, wherein the period is a period from login to logout.

21. A control method for a printing apparatus, the control method comprising:

receiving from an external apparatus print data with which user identification information for identifying a user is associated;

storing the received print data in a storage device;

storing the user identification information which is associated with the received print data when the received print data not stored in the storage device; and displaying, on the display, information indicating that the received print data has not been stored in the storage device, in a case where user identification information for identifying a user who is logged in to the printing apparatus is stored, the information is displayed at least a certain timing during a period in which the user is logged in to the printing apparatus.

\* \* \* \* \*